May 19, 1959     W. H. RYAN     2,887,007
METHOD FOR ELIMINATING UNWANTED IMAGES IN
STEREOSCOPIC LIGHT-POLARIZING PRINTS
Filed Dec. 28, 1956

INVENTOR.
William H. Ryan
BY
Brown and Mikulka
ATTORNEYS

United States Patent Office 2,887,007
Patented May 19, 1959

2,887,007
METHOD FOR ELIMINATING UNWANTED IMAGES IN STEREOSCOPIC LIGHT-POLARIZING PRINTS

William H. Ryan, Lincoln, Mass., assignor to Polaroid Corporation, Cambridge, Mass., a corporation of Massachusetts Application December 28, 1956, Serial No. 631,103

5 Claims. (Cl. 88—29)

This invention relates to new and improved light-polarizing stereoscopic prints in black and white and in full color, particularly prints which are reproduced from photographic stereoscopic records, and to methods for forming said prints as well as for controlling the appearance in said prints of unwanted densities which give rise to observable so-called ghost images.

Objects of the invention are to substantially or effectimely eliminate unwanted but frequently observable densities present in at least a first light-polarizing stereoscopic positive image of a stereoscopic pair of light-polarizing, positive, black-and-white or color images which are viewed in substantially superposed relation to each other, and particularly to processes wherein unwanted density is controlled by adding, to either or to both of the light-polarizing positive images of said pair, a relatively weak light-polarizing negative image of the other light-polarizing positive image of said pair, that is to say, by adding to either or to both of said light-polarizing images of said pair a masking image which is a negative of the other image of said pair and which possesses negative density substantially equivalent to the maximum density of a ghost image to be eliminated.

Other objects of the invention reside in the method for producing, from a pair of stereoscopic images such as a pair of photographic negatives, or a black-and-white or color transparency, a print containing a pair of light-polarizing, stereoscopic positive images by procedures involving the formation of at least a first positive image of subject material of a first one of said negatives in at least one relief printing matrix, suitable printing plate or other reproducing means, the formation of a second positive image of subject material of the second one of said negatives in at least a second relief printing matrix, printing plate or other similar means and the formation of a negative image of the subject material of at least one of said pair of negatives in at least a third relief printing matrix, printing plate or other similar means, and then by subjecting each of said matrices or other printing means to a dichroic dye, dichroic stain or dichroic printing ink and applying each of said matrices or other printing means containing one of said positive images separately in contact with an individual one of a pair of sheets of a transparent, linear, molecularly oriented, high molecular weight, hydroxyl-containing polymer characterized in that one of said sheets has the molecules thereof substantially oriented in a direction opposite to the direction of orientation of the molecules of the other of said sheets and that these two sheets of oriented plastic material are positioned and arranged so that a pair of light-polarizing right- and left-eye images formed therein are viewable in substantially superposed relation to each other, and applying said matrix or other printing means containing said negative image to that one of said sheets which carries the positive image identified with the eye opposite to which said negative image is identified; and to provide methods of the character set forth for producing black-and-white and color prints of a light-polarizing stereoscopic nature.

Further objects of the invention reside in providing as a new product a light-polarizing stereoscopic print carrying at least one pair of light-polarizing stereoscopic images and wherein the print comprises two sheets of a transparent, linear, molecularly oriented, high molecular weight, hydroxyl-containing polymer with the molecules of one sheet oriented oppositely to the direction of orientation of the molecules of the other sheet and with each sheet having dichroic material incorporated in a predetermined area thereof to form a given, positive, light-polarizing image of a stereoscopic pair of light-polarizing images and with at least the first of said sheets also having dichroic material incorporated in a predetermined area thereof forming a given, relatively weak negative copy of the positive light-polarizing image provided in the second sheet; to provide light-polarizing stereoscopic prints of the character described wherein said image-carrying sheets are located on opposite sides of a transparent support; and to provide products of this nature which contain a single pair of light-polarizing images or a multiplicity of pairs of light-polarizing images as in the case of motion picture positive prints and wherein said light-polarizing images are color images or are black-and-images.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein.

A particular advantage of the method disclosed herein is its flexibility which resides in the fact that a negative image is formed in an individual matrix, is imbibed in an individual stain or dye solution, and is individually brought into contact with a print-receiving layer. Hence, an exact control of the density and color of the negative image with respect to a given positive ghost image which it is desired to effectively eradicate is possible without affecting the matrix which carries the positive image.

As heretofore intimated, this invention is concerned with the elimination of ghost images which at times become objectionably apparent to an observer in the viewing of positive, light-polarizing, stereoscopic prints and projections thereof wherein the transmission axes of the images of the observed stereoscopic pair are oppositely oriented and are presented for observation in superposed relation with respect to each other.

Figure 3:
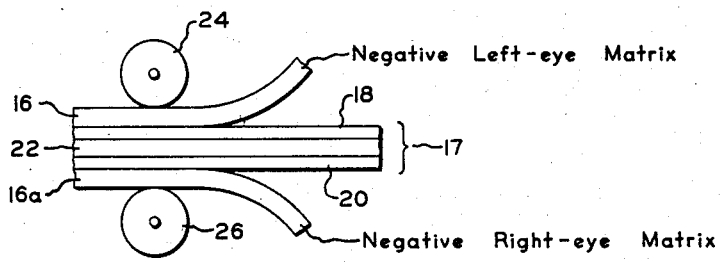
Fig. 3 is a schematic showing of the printing on stereoscopic film stock of light-polarizing negative images using relief printing matrices of the type formed through the method shown in Fig. 2.
Figure 4:
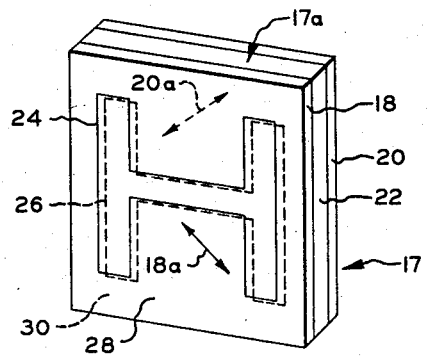
Fig. 4 is a diagrammatic perspective view of a composite stereoscopic print produced by the procedure of Fig. 3.

A suitable medium in which superposed, light-polarizing stereoscopic, left- and right-eye images may be formed is provided by the stereoscopic film stock 17 illustrated in Figs. 3 and 4 as comprising a laminar structure having two thin and transparent surface layers 18 and 20 bonded to the opposite sides of a transparent support 22. The surface layers 18 and 20 are thin sheets of a transparent, molecularly oriented, high molecular weight, hydroxyl-containing polymer of which a preferred example is polyvinyl alcohol, while the support 22 is any suitable transparent and substantially water-impermeable plastic such as cellulose acetate butyrate or cellulose triacetate.

The layer 18 preferably has its molecules so oriented that the transmission or polarizing axis of the layer will be at 45° to the edge 17a of the film stock 17, while the layer 20 has its molecules so oriented that the transmission or polarizing axis of the layer will also be at 45° to the edge of the film stock but will make an angle of 90° with the transmission axis of the layer 18. The preferred orientation, above described, is indicated by the arrows 18a and 20a in Fig. 4.

Film structures of this general nature are disclosed in U.S. Patents Nos. 2,289,714, 2,289,715 and 2,315,373. The film stock 17 provides a transparent structure useful as motion picture film or cut film. Additionally, the film stock 17 may be mounted upon an opaque, nondepolarizing, reflecting base and used for the formation of light-polarizing reflection prints. Stereoscopic image pairs formed in the film stock 17 are substantially superposed usually with some image portions in slightly offset relation to each other.

Image formation in the film stock 17 is, for example, carried out by printing the respective surface layers 18 and 20 with washoff relief matrices in each of which a solution of a suitable dichroic stain or dye has been imbibed. The washoff relief matrices are prepared from photographic originals or duplicates thereof by conventional practices and, after imbibition of a solution of dichroic printing material therein, are pressed into contact with the outer faces of the layers 18 and 20 to transfer image-forming portions of said solution to each of said layers. Where the dichroic material becomes adsorbed, for example, in a molecularly oriented plastic layer, it renders said layer light polarizing in nature and forms a light-polarizing image.

Two sets of printing matrices, one for the right-eye image and one for the left-eye image, are used for the positive reproduction of a stereoscopic pair of images in suitable film stock such as the stock 17. For color positives, each set of matrices comprises two or more individual relief matrices each of which bears a positive color separation record of one image of the stereoscopic pair of images to be reproduced. The individual matrices in a set used for color reproduction are printed successively on the stereoscopic film stock. For black-and-white positive reproduction of a stereoscopic image pair, two matrices are employed, one for the left-eye reproduction and the other for the right-eye reproduction of the stereoscopic image to be reproduced, and these matrices, with black-and-while image representations, are individually printed on opposite sides of the stereoscopic film stock. The result of printing with relief matrices in the manner described is to provide, on opposite sides of the film stock 17, positive light-polarizing images having transmission or polarizing axes at right angles to each other. Alternatively, suitable printing plates and dichroic printing inks may be used in place of the relief matrices, stains and dyes described herein.

Viewing is carried out by observing these light-polarizing images through polarizing filters located in front of each eye of the observer with the transmission axes thereof positioned at 90° to each other. Additionally, the light-polarizing filters are so positioned with respect to the light-polarizing images in the film 17 that each has its respective polarizing axis at 90° to the polarizing axis of the image to be observed therethrough. In this way, each eye sees substantially only the image intended for it.

A suitable dichroic stain comprising iodine for staining molecularly oriented polyvinyl alcohol is set forth in the previously mentioned Patent 2,315,373, while dichroic dyes of a nature suitable for the practice of the invention are set forth in all of the previously mentioned patents. In general, direct cotton dyes are usable as a class for the practice of the invention.

Dichroic stains and black dyes are useful in forming black-and-white light-polarizing images. Full color images, for example of three or more colors, may be provided by the use of cyan, magenta and yellow dyes successively applied to an image-bearing portion of the film stock from individual washoff relief matrices which carry, respectively, red, green and blue separation records of the image of the stereoscopic pair to be reproduced.

By a dichroic stain, dye or printing ink, there is meant a dye, stain or ink whose molecules possess the property of showing dichroism. In the practice of the invention, this property is displayed when said substances are incorporated in molecularly oriented plastic materials in that the resultant treated areas exhibit dichroism. The term "dichroism" is used herein to mean the property of differential absorption of the components of an incident beam of light depending upon the vibration directions of said components. Thus, the optical density of each area of a light-polarizing image is a function of the vibration direction of light incident thereon.

Light-polarizing images of the nature described are rendered not only in terms of density difference but in degree of light polarization and have low polarizing efficiency for light appearing areas but high polarizing efficiency for dark areas. When a light-polarizing image is seen through a polarizer the axis of which is parallel to the polarizing axis of the image, it has extremely low contrast or may be totally invisible. Through a polarizer whose axis is at right angles to that of the light-polarizing image, the image is seen at its normal contrast. If the two images are superposed with their axes at 90° to each other and are looked at through a polarizer, ideally, one image only will be visible at maximum contrast with the polarizer in one position, while the other image will be visible only when the polarizer has been rotated 90° from the first-mentioned position.

If an ideal light-polarizing sheet of the nature of image-carrying portions of layers 18 or 20 were to be observed through an analyzer whose transmission axis is parallel to that of the polarizer, the density (now conventionally designated $d_1$) would be zero. If the analyzer through which this ideal polarizer is viewed were rotated 90°, the density along this axis (now conventionally designated $d_2$) would be infinite. However, actual polarizers differ from this theoretical ideal. For example, in dye polarizers such as are used for the formation of light-polarizing color prints, the desired density $d_2$ varies with wavelength and $d_1$ is a smaller number which also varies with wavelength. The ratio $d_2/d_1$ is called the density ratio, frequently referred to as the dichroic ratio.

The unwanted light absorption or density $d_1$ for a first image of a light-polarizing stereoscopic pair of images may make that image observable through the analyzer for the second image of the pair when the polarizing axis of that analyzer is parallel to the polarizing axis for the first image and is crossed with respect to the second image. If the degree of this imperfection is sufficiently great, ghost images which are viewable by either or both eyes of an observer become objectionably apparent.

The heretofore mentioned unwanted density $d_1$ of a first image of a stereoscopic pair which becomes visible to the eye of an observer that is intended to see only the second image of the pair is not necessarily objectionable of itself and becomes objectionable only when it appears in contrast to the density $d_2$ or the background of the second image upon which the unwanted density $d_1$ appears to fall. This contrast occurs when an edge of an area of relatively high density $d_1$ which is supposed to be blocked from observation is in fact observable along with an area of relatively low density $d_2$ of the image which is intended to be observed. Under these conditions, it will be appreciated that visible ghost images will not be present under all conditions employing superposed, light-polarizing, stereoscopic image pairs and will be limited to particular scenes wherein density backgrounds $d_1$ of one image and $d_2$ of the second image appear in a certain overlapped relation.

In general, the invention intends to reduce the appearance of ghost images when viewing stereoscopic pairs of superposed, light-polarizing images to a degree which will be unnoticed, if not entirely eliminated, by building into either or both of the light-polarizing images of said pair a relatively weak mask which is a reverse image of the other light-polarizing stereoscopic image of said pair. Since, for observation purposes, each image of a pair of stereoscopic images will be positive images, the mask image built into each image of the pair will be a weak negative image of the other image of said pair.

It is to be assumed that a stereoscopic pair of images of the invention is formed by any suitable known photographic method as, for example, through the utilization of two commercially available taking films upon one of which there is formed the right-eye image of a scene or of an object being photographed and upon the other of which the left-eye image is formed. Following exposure, each taking film is processed to provide, either of itself or indirectly, an original negative. The original negatives may be utilized in the preparation of the heretofore mentioned printing matrices or duplicates of them may be made for this purpose. Alternatively, the printing matrices may be made from color separation negative records taken from a color negative. Black-and-white taking films are useful for black-and-white stereoscopic reproductions while commercially available color negative films are useful for stereoscopic reproduction in full color.

Figure 1:
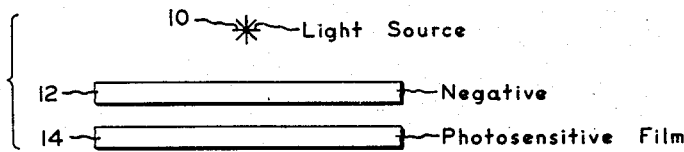
Figure 1 is a schematic showing of procedure for forming a negative masking image used in preparing a relief printing matrix.

To add to each image of a stereoscopic pair of positive images the negative images needed for ghost image control, as practiced by the present invention, requires the preparation of a positive masking image or transparency which is used in the formation of a negative relief image in a printing matrix. Formation of such a masking transparency is shown in Fig. 1. It is assumed that a stereoscopic pair of black-and-white or color negatives has previously been prepared by conventional procedures and a selected one of said negatives, for a given eye image, is shown at 12, interposed between a light source 10, of a type suitable for use in making a photographic exposure, and a photographic film 14 which may be of a photosensitive or panchromatically sensitive type. When film 14 has been thus exposed and processed it comprises a positive transparency 14a of the subject material of negative 12. Assuming, for example, negative 12 to comprise a left-eye image, the film 14, when exposed and processed, provides a positive left-eye image of the subject material of the negative.

Figure 2:
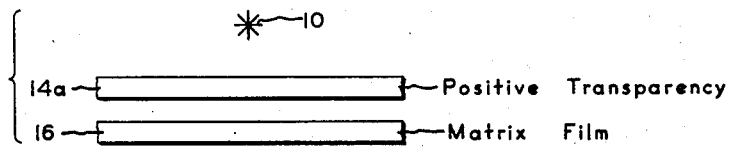
Fig. 2 is a schematic showing of the manner of employing the negative masking image obtained in Fig. 1 to form a relief printing embodying said negative masking image.

In Fig. 2 transparency 14a, namely, the aforesaid positive transparency which contains a left-eye image, is positioned between light source 10 and matrix film 16. After matrix 16 has been exposed and processed, the latter contains a negative left-eye relief image of the positive image of transparency 14a. A similar procedure to that, above-described, is followed for making a matrix 16a containing a negative right-eye relief image from a negative containing a right-eye image.

A method of providing a masking negative image for a given eye or a pair of negative images for left and right eyes in a stereoscopic light-polarizing film material 17 comprising left- and right-eye positive images formed in individual layers thereof is shown in Fig. 3. The film material 17 and the formation of positive stereoscopic images in transparent layers 18 and 20 thereof, carried by transparent layer 22 have been described hereinbefore. It may therefore be assumed, for purposes of description that layer 18 contains a right-eye, positive, light-polarizing image and layer 20 a left-eye, positive, light-polarizing image, the relative orientations of said layers and images being substantially at 90°, as shown in Fig. 4. The matrices 16 and 16a, containing negative left- and right-eye relief images, respectively, are imbibed in a suitable dichroic stain or dye, and are correctly aligned with respect to the related positive right- and left-eye images printed in layers 18 and 20 by any suitable aligning method as, for example, by having suitable registration holes of overlying marginal portions of said layers and matrices brought into alignment. The surfaces of the matrices are progressively placed in contact with said layers 18 and 20 as, for example, through relative movement of assembly 17 and matrices 16 and 16a between a pair of pressure rollers 24 and 26. A relatively weak negative left-eye image is printed by matrix 16 on portions of layer 18 predeterminedly aligned with respect to positive left-eye image portions printed on layer 20. A relatively weak negative right-eye image is printed by matrix 16a on portions of layer 20 predeterminedly aligned with respect to positive right-eye image portions printed on layer 18.

The density ratio of a negative image in the final print to a given positive image thereof, when simultaneously viewed through a polarizer having its axis crossed with that of said images, may be controlled in several ways relating to exposure or processing of film material or to a combination thereof. For example, relatively weak copies of left- and right-eye negatives may be employed in making the basic exposure illustrated in Fig. 1. Or, exposure of a film, such as 14 of Fig. 1, may be controlled to provide a relatively weak positive image therein. In either instance a relatively weak negative image would be provided in a matrix, such as 16 of Fig. 2, and in the final print. Other methods for providing weak negative images in the final print contemplate such procedures as employing relatively weak stain or dye solutions, shortening the matrix imbibition period, shortening the period of contact between the matrix and the oriented film material, or some combination of the above. The last-named methods would permit employing normal contrast negative images in the matrices. Similar considerations to those above-mentioned with respect to matrices, dyes and stains would apply to the formation and use of printing plates and the use of dichroic printing inks therewith.

Where the film assembly 17 is a stereoscopic color print, it will be understood that the right-eye positive image 24 in layer 18 is composed of two or more, and preferably three, superposed images in color, rendered in light-polarizing dyes as, for example, cyan, magenta and yellow dyes, the dye images having been successively applied in exact registration to layer 18, and that the left-eye positive image 26 in layer 20 has been similarly formed of a plurality of light-polarizing images. In conjunction with a stereoscopic black-and-white print, the negative images could be rendered in a substantially neutral tone. Where a stereoscopic color print is involved, a negative image could either be a monochrome or of a color or colors chosen with respect to the color characteristics of the ghost image to be eliminated.

A print or product resulting from utilization of the procedures and practices illustrated and described in connection with Figs. 1, 2 and 3 is diagrammatically shown in Fig. 4. A composite stereoscopic film 17 contains a right-eye stereoscopic image 24 in the front, molecularly oriented layer 18 and a relatively offset left-eye stereoscopic image 26 in the rear, molecularly oriented layer 20, said layers being bonded to intermediate transparent supporting layer 22. The print shown in Fig. 4 has been considered as derived from a pair of stereoscopic records of the letter "H" and, in accordance with the processing heretofore described, may be considered as providing either a black-and-white stereoscopic print or a color stereoscopic print.

For purposes of simplification, let it preliminarily be assumed that Fig. 4 represents a line drawing type of black-and-white stereoscopic print, the letter "H" is dark against a white background, the contrasting densities thereof being omitted in the drawing, and that no ghost images are present and therefore no negative images are employed. When viewed through a pair of light-polarizing glasses having a right-eye filter with its axis crossed relative to that of image 24 and its left-eye filter crossed relative to that of image 26, the letter "H," namely, the positive image, would appear substantially black and the surrounding area or background area 28 of layer 18 and similar superposed area 30 of layer 20 would appear substantially white. If now the composite print is assumed to be of a type which for one or more of the aforesaid causes would exhibit a ghost image of image 26 to the right eye and a ghost image of image 24 to the left eye, in the event that negative compensating images were not present, said negative images may advantageously be provided to effectively eliminate the ghost images. Assuming the inclusion of the negative images, the surrounding superposed areas 28 and 30 would appear, when viewed through light-polarizing filters, a very light gray, the density of which for each eye being provided according to the density of the relevant ghost image which it is desired to render imperceptible. As hereinbefore suggested, copies of original right- and left-eye negatives or positives can be made in which opaque areas of the former or clear areas of the latter are modified to become light transmitting to a given limited degree. These areas would, in turn, provide a negative relief image of low density in a matrix and, therefore, would produce a weak negative image in a print. Modification of the negative image density thus obtained could then be accomplished through processing steps of the type previously described to control negative densities.

As heretofore indicated, all light-polarizing stereoscopic images do not give rise to undesired ghost imaging so that practices such as those described herein apply to the correction of stereoscopic prints which display this undesired defect. For example, in the case of motion picture film which bears a pair of substantially superposed, light-polarizing, stereoscopic images in each frame thereof, it may only be necessary to determine what frames of the film display objectionable ghost images and to prepare matrices for these frames by the techniques disclosed herein.

In the production of light-polarizing, stereoscopic images, it will be found that ghost image effects, where present, are generally to be found in both of the light-polarizing images of the stereoscopic pair, although at times the appearance of "ghosts" is due solely to one image of the pair. However, in general, where a stereoscopic print is corrected for the purpose of reducing ghost image effects, it is desirable to incorporate a negative mask into each image of the stereoscopic pair so that both images are of approximately the same contrast.

It is to be noted that the masking techniques disclosed herein are not only useful for reducing ghost image effects produced when viewing light-polarizing, stereoscopic image pairs which are carried in substantially superposed relation in positive stereoscopic film, but are also useful to control objectionable ghost images in instances where the light-polarizing images of a stereoscopic pair are mounted in side-by-side relation, provided these side-by-side images are viewed in some manner such that they appear in substantially superposed relation to each other.

While I am aware that masking techniques have been used in the printing art in color reproduction and have also been used in color photography for many years, it is to be noted that the color component images of a two-dimensional multicolored image are located in register with each other and that the effect of unwanted absorption is to degrade the faithfulness with which the color of the original subject is reproduced. On the other hand, the images of a stereoscopic pair are not superposed in registered relation so that consequently any extra image resulting from unwanted absorption of light and observable when viewing the stereoscopic pair may be both obvious and annoying. In the printing art, black masks have been used to improve contrast, a function entirely different from that of the masks disclosed herein. Again, in color photography, the most conventional type of mask combines a positive of one separation with a negative of another color separation, and whereas in the present invention a positive is combined with a negative, they are generally both representative of the same separation component or of the same combination of separation components.

In contrast to previous methods of eradicating ghost images in light-polarizing stereoscopic pairs which have described the photographic exposure of a martix through a physical combination of a positive mask and a negative for each of the right- and left-eye images, and have specified printing a given eye image as, for example, a positive right-eye image and a negative left-eye image together from said matrix, as disclosed in my copending application Serial No. 421,495, filed April 7, 1954, now Patent No. 2,811,893 issued Nov. 5, 1957, the present invention sets forth the making of an individual matrix incorporating a negative relief image which is used to provide the negative masking image of the final print through application of said matrix to the composite film material already carrying the positive right- and left-eye images. In this manner the density and color properties of a negative masking image can be balanced directly and independently against similar properties of an unwanted position ghost image without the complication of combining said negative image with a positive image of differing density and probably differing color characteristics. Furthermore, it is possible to provide a sequence of negative matrices for use in producing stereoscopic motion picture film, all of which have a given density and color characteristic sufficiently suitable for the purpose, using the negatives employed in making the positive right- and left-eye prints or modified copies thereof, forming positive transparencies therefrom, exposing the matrix film through the transparencies to a given value and printing with a given stain, dye or ink and in accordance with given imbibition and contact practices. It will be apparent that the negative images could be printed prior to printing of the positive images provided the correct density and color were known or provided the subsequent printing of the positive images were brought to proper balance with respect to the negative images.

A modification of the aforementioned method also contemplates first printing on separate oriented sheets the right- and left-eye light-polarizing positive transparencies to be used in making a stereo pair or pairs, said transparencies being produced in the usual manner from positive matrices; second, exposing matrix film through both said positive transparencies and a light polarizer having its axis disposed either parallel with or at some selected given angle with respect to that of each of said transparencies, said polarizer being interposed between the transparencies and matrix film, thus producing matrix film having latent negative relief images of given density characteristics; third, processing the matrix film; fourth, printing the required negative left- and right-eye light-polarizing images of the negative image-carrying matrices on the separate sheets carrying the right- and left-eye light-polarizing positive images, respectively; and fifth, bonding the separate sheets together so that the images of each sheet are properly aligned with those of the other.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A novel method for eliminating an unwanted light-polarizing ghost density from a light-polarizing, stereoscopic, positive print composed of a stereoscopic pair of positive light-polarizing images of a subject formed on opposite sides of a transparent support, said method comprising the steps of photographically exposing photosensitive film material through one of a pair of stereoscopic negatives which together constitute the left- and right-eye records, respectively, of said subject and which were employed in forming said positive print, processing said film material to provide a positive transparency, photographically exposing a matrix film through said positive transparency to form a negative matrix, processing said matrix to provide a negative relief printing matrix, imbibing a dichroic printing substance of selected density into said negative printing matrix, and printing from said matrix in proper register on a surface of said light-polarizing stereoscopic print to form thereon a negative image which is for the eye opposite to that for the positive image printed on said surface, said negative image being provided as an image of low density relative to the pair of images forming said positive print.

2. A novel method for eliminating an unwanted light-polarizing ghost density from a light-polarizing stereoscopic print, as defined in claim 1, wherein each of said stereoscopic pair of positive light-polarizing images of said print is composed of a plurality of colored light-polarizing images rendered in dichroic printing substances.

3. A novel method for eliminating an unwanted light-polarizing ghost density from a light-polarizing stereoscopic print, as defined in claim 2, wherein said low-density negative image printed on said positive print is of a substantially neutral tone.

4. A novel method for eliminating an unwanted light-polarizing ghost density from a light-polarizing stereoscopic print, as defined in claim 2, wherein said low-density negative image printed on said positive print is of a selected color.

5. A novel method for eliminating unwanted light-polarizing ghost densities from a light-polarizing, stereoscopic, positive print composed of a stereoscopic pair of positive light-polarizing images of a subject formed on opposite sides of a transparent support, said method comprising the steps of photographically exposing photosensitive film material through a pair of stereoscopic negatives which together constitute the left- and right-eye records, respectively, of said subject and which were employed in forming said positive print, processing said film material to provide a pair of stereoscopic positive transparencies, photographically exposing a matrix film through each of said pair of transparencies to form a pair of negative matrices, processing said matrices to provide a stereoscopic pair of negative relief printing matrices, imbibing a dichroic printing substance into said negative printing matrices, and printing from said matrices, in proper register, on the opposed external surfaces of said light-polarizing stereoscopic print to form a negative left-eye image on the surface of said print which bears a right-eye positive image and a negative right-eye image on the surface of said print which bears a left-eye positive image, said negative images being provided as images of low density relative to said positive images.

References Cited in the file of this patent

UNITED STATES PATENTS

| | | |
|---|---|---|
| 2,135,197 | Norling | Nov. 1, 1938 |
| 2,811,893 | Ryan | Nov. 5, 1957 |

UNITED STATES PATENT OFFICE
CERTIFICATE OF CORRECTION

Patent No. 2,887,007 May 19, 1959

William H. Ryan

It is hereby certified that error appears in the above numbered patent requiring correction and that the said Letters Patent should read as corrected below.

Column 1, lines 22 and 23, for "effectimely" read -- effectively --; column 2, line 26, for "black-and-images" read -- black-and-white images --; line 45, for "printing embodying" read -- printing matrix embodying --; column 6, line 31, for "material" read -- materials --.

Signed and sealed this 11th day of September 1962.

(SEAL)
Attest:

ERNEST W. SWIDER
Attesting Officer

DAVID L. LADD
Commissioner of Patents